(12) United States Patent
Lazarev

(10) Patent No.: US 7,204,938 B2
(45) Date of Patent: *Apr. 17, 2007

(54) TWO-PHASE POLYMERIC MATERIALS AND METHODS FOR MAKING

(75) Inventor: Pavel I. Lazarev, Belmont, CA (US)

(73) Assignee: Nitto Denko Corporation, Osaka (JP)

(*) Notice: Subject to any disclaimer, the term of this patent is extended or adjusted under 35 U.S.C. 154(b) by 497 days.

This patent is subject to a terminal disclaimer.

(21) Appl. No.: 10/692,601

(22) Filed: Oct. 24, 2003

(65) Prior Publication Data

US 2004/0214986 A1    Oct. 28, 2004

Related U.S. Application Data

(60) Provisional application No. 60/464,927, filed on Apr. 22, 2003.

(51) Int. Cl.
*C09K 19/52* (2006.01)
*C09K 19/38* (2006.01)
*G02B 5/30* (2006.01)

(52) U.S. Cl. ............... 252/299.01; 252/299.5; 428/1.1; 428/1.31

(58) Field of Classification Search ............ 428/1.1, 428/1.31; 252/299.01, 299.5
See application file for complete search history.

(56) References Cited

U.S. PATENT DOCUMENTS

| 2,553,961 | A | | 5/1951 | Dryer |
| 4,728,547 | A | * | 3/1988 | Vaz et al. ............ 349/16 |
| 5,730,900 | A | | 3/1998 | Kawata |
| 5,739,296 | A | | 4/1998 | Gvon et al. |
| 6,049,428 | A | | 4/2000 | Khan et al. |
| 6,174,394 | B1 | | 1/2001 | Gvon et al. |
| 6,563,640 | B1 | | 5/2003 | Ignatov et al. |

FOREIGN PATENT DOCUMENTS

| WO | WO 94/28073 A1 | 12/1994 |
| WO | WO 00/25155 A1 | 5/2000 |
| WO | WO 01/63346 A1 | 8/2003 |

OTHER PUBLICATIONS

Dembo, A., et al., "Lyotropic Dye—Water Mesophases Formed by Rod-like Supramolecules", *Mol. Mater.*, 2001, 14:275.

(Continued)

*Primary Examiner*—Shean C Wu
(74) *Attorney, Agent, or Firm*—Westerman, Hattori, Daniels & Adrian, LLP.

(57) ABSTRACT

An optically anisotropic film based on a two-phase polymeric material, and a method for the fabrication is provided. The two-phase polymeric material comprises a polymer matrix and a partially crystalline film of ordered, immobilized, organic molecules. The polymer matrix provides desired mechanical properties while the crystalline film provides desired optical properties of the fabricated material.

49 Claims, 2 Drawing Sheets

OTHER PUBLICATIONS

Lee, H., et al., "Synthesis of a Nanporous Polymer with Hexagonal Channels from Supramolecular Discotic Liquid Crystals", *Angew. Chem. Int. Ed.*, 2001, 40(14): 2669-2671.

*Liquid Crystals: Applications and Uses*, B. Bahadur, ed., World Scientific, Singapore, New York, 1990, vol. 1, p. 101.

Mal'Tsev, E.I., et al., "Electroluminescent Properties of Aromatic Polyimides in the Prescence of Organic Phosphors", *Vysokomol., Soedin.*, Ser. A. 1999, 41(9): 1480.

Nazarov, V., et al., "Electronic Spectra of Aqueous Solutions and Films Made of Liquid Crystal Ink for Thin Film Polarizers", *Mol. Mater.*, 2001, 14(2): 153-163.

Tkachev, A.V., et al., "Polymethacrylates Containing Immobilized Dye: Optical and Sorption Properties", *Vysokomol. Soedin.*, 1994, 36(8): 1326.

Ignatov, L., et al., *"Molecular Alignment in Nano-Film Crystal Polarizers and Retarders"*, Physical Chemistry of Interfaces and Nanomaterials, Proceedings of SPIE, 2002 SPIE, vol. 4807, pp. 177-188. XP-001202104.

Lazarev Pavel I., et al., *"E-type Polarizers and Retarders"*, Proceedings of SPIE, 2002 SPIE, vol. 4819, pp. 46-55 XP-002261227.

\* cited by examiner

TWO-PHASE POLYMERIC MATERIALS AND METHODS FOR MAKING

RELATED APPLICATIONS

This application claims priority to U.S. Provisional Applications Ser. No. 60/464,927, filed on Apr. 22, 2003, the disclosure of which is incorporated by reference in its entirety.

FIELD OF THE INVENTION

The present invention relates generally to the field of anisotropic crystalline films. In particular the present invention provides substantial advantages in microelectronics, optics, communications, computers, and other related fields.

BACKGROUND OF THE INVENTION

The development of modem technology requires creating new materials that constitute a basis for fabricating optical, electronic, and other elements with desired properties. In particular, a necessary element in modern display design is an optically anisotropic film possessing an optimum combination of optical and mechanical properties for this application.

Optically anisotropic films may be fabricated using a variety of polymers. Anisotropic optical properties of the resultant films result from uniaxial extension, orientation in a given direction, modification with organic or inorganic (iodine) dyes, and the like. Poly(vinyl alcohol) (PVA) is employed as a base polymer (see for example *Liquid Crystals: Applications and Uses,* B. Bahadur, Ed., World Scientific, Singapore, 1990, Vol. 1, p. 101). However, because PVA-based films with dye additives have relatively low thermal stability, their application is limited.

Organic dichroic dyes may be used for the synthesis of optically anisotropic films with advantageous optical and working characteristics. Films based on these compounds may be obtained through application of a liquid-crystalline aqueous dye solution onto a substrate surface followed by evaporation of the solvent. Anisotropic properties may be imparted to the applied films through preliminary mechanical orientation of the substrate surface (see for example U.S. Pat. No. 2,553,961) or alternatively by means of an external aligning action, such as for example mechanical, electromagnetic, or other shearing forces, upon the film material in a liquid crystal state (see for example PCT patent publication No. WO 94/28073). The resulting dichroic films as well as polarizers and retarders based on these films, are characterized by desirable optical properties. However, these films nonetheless suffer from less than optimal physical, particularly mechanical, properties and are therefore not advantageously adapted for use under certain working and technological regimes.

For example, the liquid crystal display (LCD) technology involves the formation of protective layers, typically formed of thermostable polyimides obtained through cyclization of amidoacids at temperatures above 200° C. An alternative is offered by the use of a separately synthesized film possessing required parameters. Mechanical characteristics are important in applications of the optical anisotropic films such as protective masks, screens, spectacles, etc. Even simple sunglasses require materials combining excellent optical properties, radiation stability, chemical inertness with respect to moisture and sea salt, etc. Such materials are also employed in architecture, for example for antiglare coatings on windows and luminaries; for decorations such as stained glass and mosaic panels with wide color spectra that are stable under various weather conditions; and for other similar purposes.

The required working characteristics may be imparted to liquid crystal films using unique mechanical, hydrophobic, and thermal properties of macromolecular compounds-polymers. However, the formation of strong covalent bonds, which are responsible for these properties, by direct interaction of macromolecules with supramolecular dye complexes for thermodynamic reasons can lead to the irreversible degradation of supramolecules and, hence, to the impossibility of obtaining the final material possessing desired optical properties.

Other interactions, such as for example adhesion, between dyes and polymers traditionally employed as substrates, may introduce additional problems. Bonds formed upon the introduction of dyes into the structure of macromolecules by means of specific solvation, hydrogen bonds, hydrophobic interaction, or by other means are rather weak and the resulting systems are unstable. Films formed by these methods have characteristics that resemble those of to simple polymer—dye blends (see for example A. V. Tkachev, D. N. Kiselev, V. A. Tverskoi, and E. I. Soborover, "Polymethacrylates Containing Immobilized Dye: Optical and Sorption Properties," *Vysokomol. Soedin.* 1994, 36 (8), 1326).

Another method for enhancing retention of a the dye phase in a polymer involves introducing dye molecules as dopants in the polymers, followed by liquid-crystalline aggregation of the dye on the polymer surface. Cyanine dyes have been employed as dopants in aromatic polyimides (see for example E. I. Mal'tsev, D. A. Lypenko, B. I. Shapiro, M. A. Brusentseva, E. V. Lunina, V. I. Berendyaev, B. V. Kotov, and A. V. Vannikov, Electroluminescent Properties of Aromatic Polyimides in the Presence of Organic Phosphors, *Vysokomol.* Soedin., Ser. A, 1999, 41 (9), 1480). However, the aggregation process is complicated, energy consuming, and does not provide for the obtaining of materials with desired optical properties.

U.S. Pat. No. 5,730,900 discloses a solution containing a discotic substituted polycyclic compound with polymerizable groups as substituents and a liquid-crystalline substance was applied onto an oriented polymer substrate, heated at a certain rate to about 100° C. to provide a homogeneous orientation of the discotic layer, irradiated with UV light at 110° C. for 20 min, and cooled to obtain a film comprising a polymer matrix with liquid-crystalline inclusions. However, the required individual selection of compatible solvents for the system components, and high temperatures and/or UV radiation required to initiate the polymerization process significantly limit the applicability of this method, especially for liquid-crystalline objects such as water-soluble dyes.

Accordingly, development of new methods and materials for the synthesis of optically anisotropic films that avoid these problems is desirable.

SUMMARY OF THE INVENTION

The present invention provides, among other advantages, anisotropic materials with improved working characteristics, including strength, moisture resistance, and thermal stability. These and other advantages of the present invention may be achieved by creating a two-phase polymeric material. One component of this material is a crystalline film of an organic compound with ordered molecular structure, which provides the optical properties of the material. A second component of materials according to the present invention is a polymer matrix formed by the molecules of a binding agent. This polymer matrix supplies the mechanical properties of the material to facilitate proper functioning of the first component over a broader range of operating and environmental conditions than is possible with prior art films and materials.

The present invention further provides a method for manufacturing optically anisotropic film materials possessing these advantageous properties. In one embodiment, the method includes the step of immobilizing a lyotropic liquid crystal by treatment with a polyion-type compound. The lyotropic liquid crystal comprises a solution of supramolecules in a solvent. The supramolecules comprise molecules of a modified organic substance. These molecules each have one or more modifying functional groups. The polyion-type compound is capable of forming counterions for the functional groups. An external orienting force or action is exerted on the material to order the immobilized lyotropic liquid crystal. The solvent is substantially removed to form a first phase that comprises a film of the ordered, immobilized organic molecules. A second phase that comprises a polymeric matrix is formed by treating the film with a binding agent.

BRIEF DESCRIPTION OF THE DRAWINGS

Other objects and advantages of the present invention will become apparent upon reading the detailed description of the invention and the appended claims provided below, and upon reference to the drawings, in which:

DETAILED DESCRIPTION OF THE INVENTION

Figure 1:
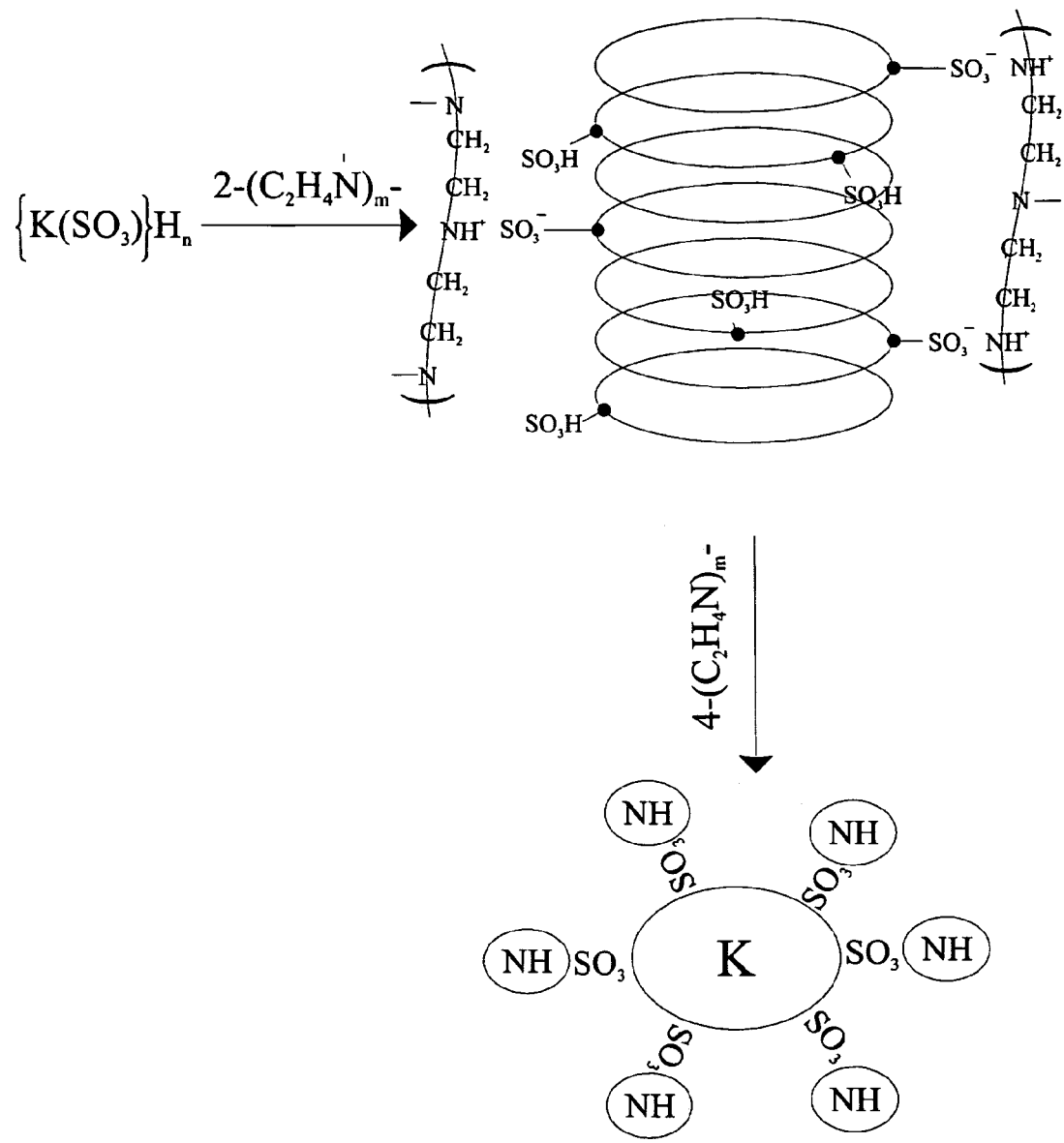
FIG. 1 is a schematic diagram illustrating interactions between supramolecules of sulfonated discotic organic molecules and polyethylene polyamine molecules.
Figure 2:
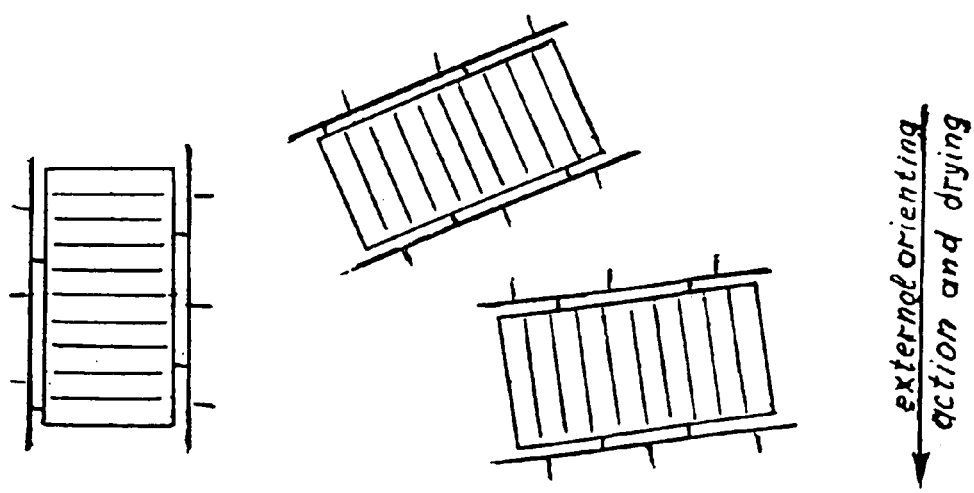
FIG. 2 is a schematic diagram showing the structure of a lyotropic liquid crystal of immobilized supramolecules.
Figure 3:
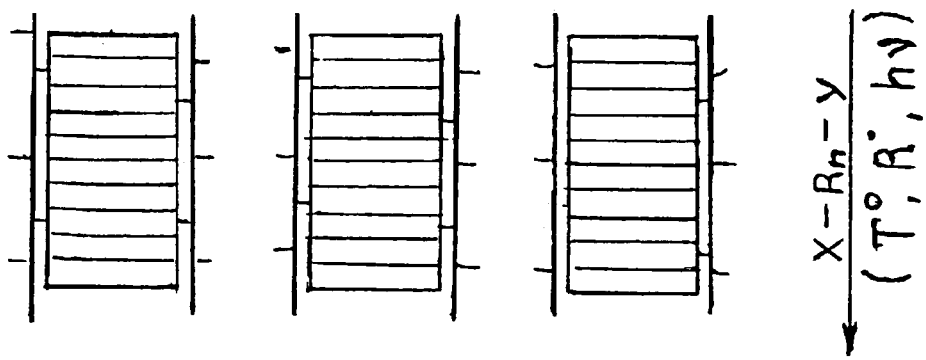
FIG. 3 illustrates the formation of a film of ordered immobilized organic molecules.
Figure 4:
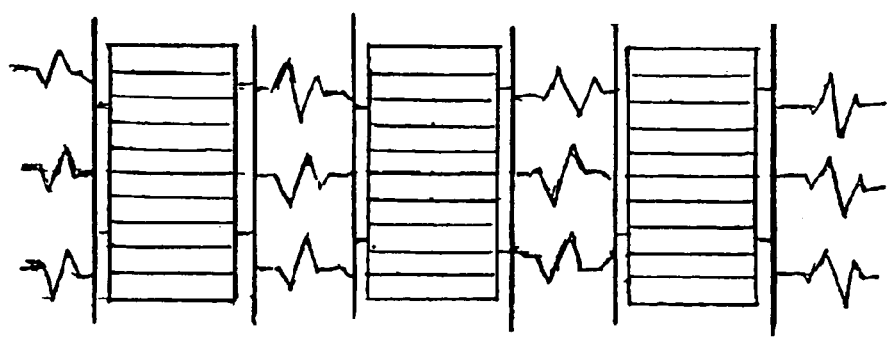
FIG. 4 illustrates the obtaining of a two-phase polymeric material by treating the film with a binding agent.

A two-phase polymeric material combining good optical and mechanical properties according to the present invention is provided by a lyotropic liquid crystal (LLC) system of supramolecules. These supramolecules comprise at least one organic compound, the molecules of which contain at least one modifying functional group that increases the solubility of the organic compound in a polar solvent for the purpose of obtaining a lyotropic liquid-crystalline mesophase.

As used in the foregoing discussion of the present invention, discotic molecules of an organic substance are amphiphilic planar molecules of an organic compound, particularly those of an ellipsoidal shape. These molecules are advantageously polycyclic compounds, such as for example aromatic and heterocyclic compounds, with conjugated π bonds. These molecules further include substituent modifying functional groups and can be described by the general formula

{R}(F)n,  (1)

where R is a polycyclic organic compound with conjugated π bonds; F is a modifying functional group, and n is the number of modifying functional groups. The modifying functional groups may be ionogenic, and further include one or more counterions. Such ionogenic groups enhance solubility in polar solvents. One example of such compounds is the organic dyes described below. Alternatively, the groups may be nonionogenic and determine the solubility in solvents and spectral characteristics.

Supramolecules, as used in this description, are aggregates formed by the molecules of polycyclic organic compounds in solution according to one embodiment of the present invention. Lyotropic liquid crystal (LLC) or liquid-crystalline mesophase are systems formed by supramolecules in solution under certain conditions of concentration and temperature. Crystalline or at least partially crystalline films are anisotropic films formed upon drying and curing (for example, solidification) of a layer of ordered immobilized supramolecules. Immobilization refers to a certain limitation of the relative mobility of molecules of an organic compound entering into supramolecules, caused by their binding to a polyion. Two-phase polymeric materials are composite materials comprising a crystalline film formed by ordered immobilized molecules of an organic compound entering as a filler into a polymer matrix formed by the binding agent. In the disclosed invention, the term phase implies the state of matter which is all-homogeneous with respect to both chemical composition and physical state.

The present invention employs organic substances or compounds, the molecules of which are characterized by a planar configuration, contain at least one modifying functional group, and are capable of forming supramolecules. As the solution concentration increases, these supramolecules tend to form lyotropic liquid crystals.

According to one embodiment of the present invention, supramolecules shaped like columns or "stacked coins" comprise the main structural elements of the LLC or liquid-crystalline mesophase. The molecules that form the mesophases are advantageously amphiphilic with a planar shape and having small terminal polar groups arranged at the periphery. These groups account for the solubility of the polycyclic organic compound by interacting with molecules of polar solvents, such as for example water. This solvation interaction facilitates formation of ordered structures of organic molecules of the same type. Compounds according to the present invention that undergo these interactions may be characterized by a phase diagram having a domain of stability over a broad range of concentrations, temperatures, and pH values. It is also possible to mix various systems in solution with the formation of combined molecular aggregates. In layers obtained from these solutions, the absorption and refraction indices can vary within the limits determined by the initial components (see for example V. Nazarov, L. Ignatov, and K. Kienskaya, Electronic Spectra of Aqueous Solutions and Films Made of Liquid Crystal Ink for Thin Film Polarizers, *Mol. Mater.* 2001, 14, 153–163). This mixing is possible because a wide variety of compounds are characterized by a similar intermolecular distance that is typically in the range of approximately 3.4±0.3 Å. The subsequent formation of a three-dimensional crystal possessing intermediate optical characteristics proceeds more readily in the course of drying of the initially wet layer.

The highly ordered organic molecules in the columns make these mesophases advantageous for the production of oriented dichroic materials. Films formed from materials according to the present invention exhibit a high degree of optical anisotropy. These films also have polarizing properties, related to the light absorption by supramolecules, and retardation (alternatively referred to as "phase-shifting") properties in spectral regions where the film does not substantially optically absorb. The phase-shifting properties of the films are related to their birefringence, whereby the refractive index in the direction of application is different from that in the perpendicular direction.

Ionogenic functional groups attached to the organic molecules enhance their solubility in polar solvents and ensuring the formation of mesophases. In one embodiment, these ionogenic groups are the anionic groups of strong mineral acids, such as for example sulfonic, sulfate, and phosphate groups, as well as weakly acidic carboxy groups. The ionogenic groups may be balanced by cationic counter ions, including but not limited to $H^+$, $NH_4^+$, $K^+$, $Li^+$, $Na^+$, $Cs^+$, $Ca^{2+}$, $Sr^{2+}$, $Mg^{2+}$, $Ba^{2+}$, $Co^{2+}$, $Mn^{2+}$, $Zn^{2+}$, $Cu^{2+}$, $Pb^{2+}$, $Fe^{2+}$, $Ni^{2+}$, $Al^{3+}$, $Ce^{3+}$, $La^{3+}$, as well as mixtures of these and other cations. The cations may be retained in the molecular structure in the course of lyotropic liquid crystal phase formation. The ionogenic groups may include cationic fragments such as amino-, and one or more amphoteric groups with pH-dependent properties.

The present invention makes use of soluble organic substances or compounds that are capable of forming lyotropic liquid crystals. Compounds of this type have been previously described, such as for example in published PCT patent application WO 01/63346 and include but are not limited to polymethine dyes (e.g., peudoisocyanine, piacyanol), triarylmethane dyes (e.g., Basic Turquose, Acid Light Blue 3); diaminoxanthene dyes (e.g., sulforhodamine); acridine dyes (e.g., Basic Yellow K); sulfonated acridine dyes (e.g., trans-quinacridone); water-soluble derivatives of anthraquinone dyes (e.g., Active Light Blue KX) sulfonated vat dye products (e.g., flavanthrone, Indanthrene Yellow, Vat Yellow 4K, Vat Dark-Green G, Vat Violet C, indanthrone, Perylene Violet, Vat Scarlet 2G); azo dyes (e.g., Benzopurpurin 4B, Direct Lightfast Yellow O); water-soluble diazine dyes (e.g., Acid Dark Blue 3); sulfonated dioxazine dye products (pigment Violet Dioxazine); soluble thiazine dyes (e.g., Methylene Blue); water-soluble phthalocyanine derivatives (e.g., copper octacarboxyphthalocyanine salts); fluorescent whiteners; and other related structures including but not limited to Perylenetetracaboxylic Acid Diimide Red (PADR), benzimidazoles of PADR (violet) and naphthalenetetracarboxylic acid (yellow, claret), and sulfo- and aminoderivatives of benzimidazoles and phenanthro-9,10:2,3-quinoxaline.

Lyotropic liquid crystals are typically based on a polar solvent. The most common polar solvent is water or a mixture of water with an organic solvent. The organic solvent in this case is advantageously at least partially miscible with water.

The advantages of the present invention may be achieved by forming a lyotropic liquid crystal using ionogenic organic molecules in the form of water-soluble sulfoderivatives, either individually or in mixtures of such compounds. The compounds may be sulfonated according to any known method, such as for example those disclosed in U.S. Pat. Nos. 5,739,296 and 6,049,428. When dissolved in water, the molecules of sulfoderivatives or their mixtures form anisometric (rod-like) aggregates packed in a manner that resembles a stack of coins. Each aggregate in such a solution is a micelle with an electric double layer. The solution as a whole may be characterized as a highly dispersed (colloidal) lyophilic system. As the concentration of aggregates (micelles) in the solution is increased, the anisometric aggregates undergo spontaneous ordering (also referred to as "self-ordering"), which leads to the formation of a nematic lyotropic mesophase as the system becomes liquid-crystalline (see for example A. Dembo, A. Ionov, P. Lazarev, A. Manko, and V. Nazarov, Lyotropic Dye—Water Mesophases Formed by Rod-like Supramolecules, *Mol. Mater.* 2001, 14, 275).

According to one embodiment of the present invention, the solution may be concentrated by evaporating a solution of a sulfoderivative, which may comprise a single compound, a mixture of sulfoderivative compounds, or a mixture with one or more of the organic molecules discussed above that have limited light absorbance in the visible spectral range. The concentration of this compound or mixture of compounds is advantageously in the range of approximately 3 to 10% by mass. Concentration of such a solution leads to the formation of a lyotropic liquid crystal.

The concentration of a sulfoderivative or of a mixture of sulfoderivatives in the mesophase may range from approximately 3 to 50% by mass. The concentration is advantageously in the range of 7 to 15% by mass. The lyotropic liquid crystal may contain up to approximately 5% by mass of surfactants and/or plasticizers. By varying the number of sulfonic groups and the number and character of substituents (such as ethyl, methyl, chlorine, bromine) in the discotic molecules, it is possible to control the hydrophilic-hydrophobic balance of aggregates formed in liquid-crystalline solutions and to change the solution viscosity. Formation of the liquid crystal state is readily verified by usual methods, for example, with the aid of a polarization microscope.

Compounds used in the formation of LLC or liquid-crystalline mesophases may contain several ionogenic and nonionogenic substituent functional groups. These groups may enter in any combinations (including both like and unlike molecules) capable of forming a stable lyotropic liquid crystal. After removal of the solvent, these mesophases may form anisotropic, at least partially crystalline films possessing excellent optical characteristics.

A method for preparing a two-phase polymeric material according to the present invention includes treatment of one of the LLCs described above. A material combining the properties of a polymer with the properties of an optically anisotropic organic liquid crystal mesophase may be formed through selection of a LLC and then modifying it as follows to create a coupling agent as a buffer between a "soft" first phase comprising relatively mobile long stacks of organic molecules transformed into a film and a "rigid" second phase comprising a polymer matrix. The present invention employs compounds of the polyion type, such as polyelectrolytes and salt-forming agents, as counterions with respect to the ionogenic groups of the organic molecules. These polyion compounds include, among others, oligomers, polymers, or their blends. Monomers can bind only two neighboring groups to form a dimer and are readily leached out by solvents.

For anionic sulfonic groups, the counterions may include polycations, particularly polyamines such as polyethylene polyamines (PEPAs), that forming positive ions in solution. Cationic substituents, including amino groups, may be associated with counterions such as, for example, carboxyl-containing polymers such as polyacrylates. The polyions preferably act to preserve the existing lyotropic liquid crystal of organic molecules. Alternatively, the polyions may reversibly destroy the LLC that is subsequently restored upon concentration of the solution. The interaction between a polyion compound and ionogenic groups takes place along the entire length of supramolecules formed by organic molecules in the LLC. The bonds are formed parallel to the optical axis of the column at a distance that is a multiple of the spacing of discotic molecules in supramolecules, for example, in the range of approximately 3.4±0.3 Å). The number of ion pairs is generally significantly smaller than the number of reactive groups in a supramolecule. This last fact is related both to the length of segments and to steric hindrances that may be created by the neighboring supramolecules. For this reason, the number of polyions generally substantially exceeds—often by as much as about twelve times—the equimolar amount. Polyion ionic groups that are not involved in interactions with the ionogenic groups on a supramolecule may participate in subsequent conversions, in particular, by reacting with molecules of the polymer matrix.

These ion interaction lead to the formation of a protective coating of polymer molecules around still mobile columns of supramolecules, and may be considered as an immobilizing interaction. In this case, the immobilized reactant loses a certain degree of freedom but retains or, alternatively, alters only slightly the main chemical and physical properties of the supramolecule. Retaining some amount of mobility of the immobilized mesophase is advantageous in the method of the present invention. This facilitates the next stage in the method according to the present invention, which relates to orientation of the supramolecules in the liquid-crystalline solution by application of an external orienting action or force.

Methods that may be used for the external orienting action are disclosed in U.S. Pat. Nos. 5,739,296; 6,174,394 and 6,563,640, which are included by reference. This external orienting action may be based on the use of various factors including but not limited to mechanical, electrical, magnetic, etc. The intensity of this action, which is advantageously sufficient to provide for a required orientation to the kinetic units of the lyotropic liquid crystal, depends on the properties of the liquid-crystalline solution, such as its nature, concentration, temperature, etc. The appropriate orienting action intensity for a given LLC may be identified by one or ordinary skill in the art through routine experimentation based on the teachings provided here. The resulting oriented structure is a basic property of materials according to the present invention and related articles made of this material.

In one specific embodiment, the external orienting action upon the layer of a lyotropic liquid crystal of organic molecules is produced by mechanical shear. This is achieved through directed mechanical motion of one or several alignment devices of various types, including a knife and/or a cylindrical wiper and/or a flat plate oriented parallel to the applied layer surface and/or at an angle to this surface, whereby a distance from the surface to the edge of the aligning instrument is preset so as to obtain a film of required thickness. The surface of the alignment instrument may be provided with a certain relief. The alignment may alternatively be performed using a heated instrument. Another variant of orientation by external action comprises extruding a concentrated liquid-crystalline solution from a draw plate under pressure. Here, the orientation proceeds immediately in the plate, in the course of the liquid crystal phase ejection. In the course of extrusion, the draw plate is moved so as to provide that the extruded layer would uniformly cover a substrate.

Upon solvent removal under mild conditions at room temperature (20° C.) for a time period from approximately 5 minutes to 3 hours or, alternatively, by heating in the temperature range of approximately 20 to 60° C. at increased humidity, the substrate is covered by an oriented layer containing an immobilized phase of organic molecules.

The regime of the solvent removal is advantageously selected so as to avoid impairing the orientation of the previously formed lyotropic liquid crystal structure, while providing for the relaxation of stresses arising in the course of the external orienting action. The solvent removal stage is advantageously performed under conditions of elevated humidity, preferably of not less than 60%. Important factors ensuring a high degree of crystallinity of the material layer are the rate and directional character of the process of solvent removal from the system. The resulting layer represents a sufficiently thin continuous film possessing a molecularly ordered structure, in which organic molecules are grouped in orientation-ordered ensembles. The formation of this structure is determined by a special liquid-crystalline state of the molecules in solution, in which they already possess a local order, entering into one- and/or two-dimensional oriented quasicrystalline aggregates. When applied on a substrate surface, with simultaneous application of as external orienting action, such a system acquires macroscopic orientation. This orientation is not only retained in the course of drying, but may even increase due to crystallization.

The resulting film is crystalline, with an interplanar spacing on the order of 3.4±0.3 Å. The film is generally birefringent, exhibits dichroism, and possesses phase-shifting (retarder) properties related to a difference in refractive indices in the mutually perpendicular directions relative to the optical axis.

The next process stage comprises treating the film of an ordered structure of organic molecules with a binding agent to form a unified physicochemical system and eliminate defects in the film by filling the intercolumnar (interstack) space with a polymeric medium. The filling process may be performed using either polymerizable monomers or polymers. The binding agent is advantageously selected either from a class of compounds containing reactive (polymerizable) groups (nucleophilic or electrophilic), from saturated or unsaturated compounds, or from compounds of a mixed type. The polymerizable binding agents may be polymerized by a radical, condensation, ion, or combined mechanism. Most typical compounds of this type are described by the general formula $$X-R_n-Y \qquad (2)$$

where R is a group selected from the list including —$CH_2$—, —Ar—, —NH—, —$CH_2$—O—, —$CH_2$—CH(OH)—, —CH(Ar)—, and the like; n has a value in the range between approximately 0 and 40; X and Y are selected from the list including —$CH_3$, =$CH_2$, =CH(Ar), —CH=$CH_2$, —CH—CH(O), —$NH_2$, —OH, —NCO, —COOH, —COCl, —Cl, etc.

The polymerization process may be initiated by thermal, radiative (UV), or chemical action. In the case of the UV-initiated polymerization, the binding agent advantageously further comprises photosensitizers, such as for example, ketones, benzophenone, etc., in an amount of up to approximately 0.5% by mass. One of the reactants may be an immobilized polyion compound with reactive groups not involved in the interaction with ionogenic functional groups of the discotic molecules. The formation of polymer bonds can be monitored, for example, by IR spectroscopy.

The ready-to-use polymer matrices of the present invention may include optically transparent (co)polymers synthesized by any mechanism, introduced from melt or solution in any organic solvent (homo- and heterogeneous systems), the only condition being that the polymerization process should not disturb the existing ordered structure of organic molecules.

The polymer matrix may account for up to approximately 65% by mass of the system. The matrix may contain various modifying additives, either separate or in mixtures with a total content of up to approximately 5% by mass. The degree of polymerization is above approximately 40 for aromatic monomers and above approximately 120 for aliphatic monomers, so that polymers are formed rather than oligomeric molecules, which is an important factor determining mechanical properties of the matrix. The length of macromolecules is advantageously not shorter than the interstack distance (40–100 Å) between supramacromolecules. The molecular weights of the synthesized products range from approximately 4000 to 20000, predominantly falling within approximately 5000 to 8000. The molecular weight may be significantly greater, by a factor of approximately ten or more, but this may complicates the formation of high-quality films, especially from water-soluble polymers.

The final stage of a method according to the present invention is drying and/or curing of the polymer matrix containing a structurally ordered phase of the film of organic molecules, in the course of which the material acquires the desired structure necessary to form various useful articles. This process may be carried out in various regimes at elevated temperatures (above approximately 100° C.), with the exposure time varied from approximately several minutes to approximately 10 hours. The strength characteristics of the final material advantageously correspond to the standard values for particular polymers employed.

An optically anisotropic film according to another embodiment of the present invention comprises a layer of the two-phase polymeric material. The film may contain additional isotropic and/or anisotropic layers. The material comprises two phases: a first phase comprising a crystalline film that comprises ordered, immobilized, molecules of an organic compound, and a second phase comprising a polymer matrix. The organic molecules of the first phase advantageously each contain at least one ionogenic group. The resulting material may serve as a hydrophobic or hydrophilic substrate, depending on the properties of a polymer matrix. This may be used for depositing new layers of the mesophase of organic molecules or a polymer, in particular, with different thermodynamic characteristics, that is, for the obtaining of multicomponent and multiphase systems such as multilayer films.

EXPERIMENTAL

Experiments were conducted according the method and system of the present invention. These examples are intended for illustration purposes only, and are not intended to limit the scope of the present invention in any way.

EXAMPLE 1

A polymeric material based on sulfoderivatives of perylenetetracaboxylic acid dibenzimidazole was synthesized as follows. 0.091 g (corresponding to 6 eq. nitrogen per 1 eq. sulfonate) of polyethylene polyamine (PEPA) was added to 3.125 g of a 3.1% aqueous solution of a mesophase-forming dye. The kinetics of sulfonic group binding in the mixture was monitored by potentiometric titration with alkali. After termination of the reaction, the solution of the immobilized dye was applied to a glass substrate. After the appearance of a liquid-crystalline dye phase, the glass plate which is used as an alignment instrument, was shifted relative to a substrate to obtain an ordered polymer-immobilized dye film. Finally, the material was dried in air for 1 hour at room temperature. The film had a thickness of 2 microns and exhibited anisotropic optical properties.

The substrate with carrying the film was immersed in a 10% solution of an epoxidian resin ED-16 (epoxy equivalent ~550) in xylene. A solid polymer film was obtained after withdrawal and drying for 2 hours at 140° C. The film had a thickness of 4 microns and contained a crystalline dye phase. An IR spectrum of the film included absorption bands due to reactive groups in the region of 3450–3250 $cm^{-1}$, 917 $cm^{-1}$ and 6500 $cm^{-1}$. The ultimate strength for bending was 85 Mpa.

Spectral measurements of the sample polymer films were performed with Ocean PC 2000 and Cary-500 (Varian) spectrometers. In the wavelength range of 400–700 nm, the spectral characteristics of the polymer film corresponded to those previously reported for films based on the dye (Violet), in for example V. Nazarov, L. Ignatov, and K. Kienskaya, Electronic Spectra of Aqueous Solutions and Films Made of Liquid Crystal Ink for Thin Film Polarizers, *Mol. Mate.*, 2001, vol.14, pp.153–163.

EXAMPLE 2

A polymeric material based on diaminonaphthoylene benzimidazole was synthesized as follows. 0.15 g of water-soluble polyacrylic acid oligomer (Aldrich; mol. weight, 1200), corresponding to 6 eq. of carboxy groups per 1 eq. nitrogen, was added to a flask with 4.8 g of a 5.2% aqueous solution of a mesophase-forming polycyclic compound containing amino groups. The formation of an immobilized system was monitored by a change in the characteristic absorption band at 420 nm (the appearance of a long-wavelength shoulder at 480 nm) in the electronic absorption spectra using a Cary-500 spectrometer. Upon termination of the reaction, the solution was applied onto a glass substrate. After the appearance of a liquid-crystalline mesophase of immobilized organic substance, another glass plate used as an alignment instrument was moved relative to the substrate to obtain an ordered film. Finally, the material was dried for 15 min in air at room temperature. The film had a thickness of 1.8 microns and exhibited anisotropic optical properties.

The substrate carrying the film was immersed for 3 to 4 seconds in a 5 to 6% solution of poly(methyl methacrylate) with a molecular weight of about 8000, in a monomer containing 0.037 g (0.5% solution) of a photoinitiator (benzophenone). The substrate was extracted form the solution, exposed for 15 min to UV radiation, and then dried for 2 hours in air at room temperature.

The optical properties of this film are listed in the table below.

| Sample | Transmittance, % | | | | | |
| --- | --- | --- | --- | --- | --- | --- |
| | T | $H_0$ | $H_{90}$ | $E_p$ | CR | $K_d$ |
| Film | 87.40 | 76.47 | 76.29 | 3.5 | 1.0 | 1.7 |
| Film after post-treatment | 86.42 | 74.75 | 74.61 | 3.0 | 1.0 | 1.5 |

T, $H_0$, and $H_{90}$ are the characteristics of transmission of the nonpolarized and polarized (parallel and perpendicular) light, respectively; $E_p$ is the polarization efficiency; CR is the contrast ratio; and $K_d$ is the dichroic ratio. The final film had a thickness of 3.5 microns and a strength of 40 MPa. The film exhibited no exfoliation or cracking and was water-resistant, and its optical properties began to change substantially only upon heating above 100° C.

The above experimental data indicate that the optical characteristics of films according to the present invention correspond to those of the individual substance before treatment with a binding agent and the formation of a polymer matrix, while the mechanical properties are determined by those of the polymer matrix. These results confirm advantages of the present invention, which are determined by the original treatment of the molecules of an organic compound forming liquid-crystalline mesophase in solution. The treatment with immobilizing polyions, in combination with the other operations, leads to the formation of a new two-phase polymeric material.

The obtained two-phase polymeric material offers an alternative for replacing previously known optically anisotropic films and furthermore possesses superior optical and mechanical properties and can be used in articles such as protective screens, sunglasses, etc.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A method for making a two-phase polymeric material, comprising the steps of:
   immobilizing a lyotropic liquid crystal by treatment with a polyion compound, wherein the lyotropic liquid crystal comprises a solution of supramolecules in a solvent, the supramolecules comprise molecules of a modified organic substance, the molecules each have one or more modifying functional groups, and the polyion compound is capable of forming counterions for the modifying functional groups;
   exerting an external orienting force to order the immobilized lyotropic liquid crystal;
   substantially removing the solvent to form a first phase that comprises a film of the ordered, immobilized organic molecules; and
   forming a second phase that comprises a polymeric matrix by treating the film with a binding agent.

2. The method of claim 1, wherein the lyotropic liquid crystal is formed by concentrating a solution of supramolecules.

3. The method of claim 1 wherein the organic molecules are discotic molecules of the modified organic compound.

4. The method of claim 1, wherein the concentration of the lyotropic liquid crystal in the solution is in the range of approximately 3% to 50% by mass.

5. The method of claim 1, wherein the concentration of the lyotropic liquid crystal in the solution is in the range of approximately 7% to 15% by mass.

6. The method of claim 1, wherein the solvent is water.

7. The method of claim 1, wherein the solvent comprises water and an organic solvent that is miscible with water.

8. The method of claim 1, wherein the steps of the external orienting action and the solvent removal take place simultaneously.

9. The method of claim 1, wherein the modified organic substance has the general formula $$\{R\}(F)_n,$$

where R is a polycyclic organic compound with conjugated $\Pi$ bonds, F is a modifying functional group, and n is the number of modifying functional groups.

10. The method of claim 9, wherein the modifying functional groups are ionogenic, and wherein the ionogenic groups have associated therewith one or more counterions.

11. The method of claim 9, wherein the modifying functional groups are nonionogenic.

12. The method of claim 1, wherein the lyotropic liquid crystal further comprises a surfactant or a mixture of surfactants with a concentration of less than approximately 5% by mass.

13. The method of claim 1, wherein the lyotropic liquid crystal further comprises a plasticizer or a mixture of plasticizers with a concentration of less than approximately 5% by mass.

14. The method of claim 1, wherein the polyion compound is selected from oligomers, polymers, and their blends, and wherein the interaction of the polyion compound with the ionogenic groups does not disturb the lyotropic liquid crystal.

15. The method of claim 1, wherein the external orienting force comprises one or several external actions selected from the list consisting of an electric field, a magnetic field, and mechanical shear.

16. The method of claim 1, wherein the solvent is removed at a temperature in the range of approximately 20 to 60° C. and at a relative humidity greater than approximately 60%.

17. The method of claim 16, wherein the solvent is removed at a temperature of approximately 20° C. for less than approximately 3 hours.

18. The method of claim 1, wherein the formation of the second phase further comprises interaction of the reactive groups of the film of the ordered, immobilized organic molecules with molecules of the binding agent.

19. The method of claim 1, wherein the binding agent comprises an organic molecule selected from the class of organic substances containing nucleophilic reactive groups.

20. The method of claim 19, wherein the polymer matrix is formed by a condensation mechanism.

21. The method of claim 20, wherein the polymer matrix formation is initiated by chemical interaction.

22. The method of claim 1, wherein the binding agent comprises an organic molecule selected from the class of organic substances containing an electrophilic reactive group.

23. The method of claim 22, wherein the polymer matrix is formed by an ion mechanism.

24. The method of claim 23, wherein the polymer matrix formation is initiated by chemical interaction.

25. The method of claim 1, wherein the binding agent comprises a saturated or unsaturated compound.

26. The method of claim 25, wherein the polymer matrix is formed by a radical mechanism.

27. The method of claim 26, wherein the polymer matrix formation is initiated by thermal reaction or chemical interaction.

28. The method of claim 26, wherein the polymer matrix formation is initiated by UV radiation.

29. The method of claim 28, wherein the binding agent further comprises a photosensitizer with a concentration less than approximately 0.5% by mass.

30. The method of claim 29, wherein the polymer matrix formation is initiated by UV radiation.

31. The method of claim 1, wherein the binding agent further comprises a photosensitizer with a concentration less than approximately 0.5% by mass.

32. The method of claim 1, wherein the binding agent comprises a solution of at least one polymer that does not disturb the film of the ordered immobilized system of organic molecules.

33. The method of claim 32, wherein the binding agent further comprises a photosensitizer with a concentration less than approximately 0.5% by mass.

34. The method of claim 1, wherein the binding agent comprises a melt of at least one polymer that does not disturb the film of the ordered immobilized system of organic molecules.

35. The method of claim 34, wherein the binding agent further comprises a photosensitizer with a concentration less than approximately 0.5% by mass.

36. The method of claim 1, further comprising the step of:
   drying the polymer matrix at a temperature greater than approximately 100° C. for less than approximately 10 hours.

37. A two-phase polymeric material, comprising:
   a first phase comprising a partially crystalline film that comprises ordered, immobilized, organic molecules wherein the molecules contain at least one modifying functional group; and
   a second phase comprising a polymer matrix, wherein the first phase comprises less than approximately 35% by mass of the material.

38. The two-phase polymeric material formed by the method of claim 1.

39. The two-phase polymeric material of claim 37, wherein the modifying functional groups are ionogenic.

40. The two-phase polymeric material of claim 37, further characterized in that the material is anisotropic and has a crystalline structure having an interplanar spacing in the range of approximately 3.4±0.3 Å along one of the optical axes of the crystalline structure.

41. The two-phase polymeric material of claim 37, wherein the polymer matrix is formed from aromatic monomers and has a degree of polymerization greater than approximately 40.

42. The two-phase polymeric material of claim 37, wherein the polymer matrix is formed from aliphatic monomers and has a degree of polymerization greater than approximately 120.

43. The two-phase polymeric material of claim 37, wherein the polymer matrix has a molecular weight in the range of approximately 4000 to 20000.

44. The two-phase polymeric material of claim 37, wherein the polymer matrix has a molecular weight in the range of approximately 5000 to 8000.

45. The two-phase polymeric material of claim 37, wherein the polymer matrix further comprises plasticizers at a concentration of less than approximately 5% by mass.

46. An optically anisotropic film comprising a layer of the two-phase polymeric material of claim 37.

47. The film of claim 46, wherein the film is polarizing.

48. The film of claim 46, wherein the film is a retarder.

49. The film of claim 46, wherein the film further comprises additional isotropic and/or anisotropic layers.

* * * * *